(12) United States Patent
Miyakoshi et al.

(10) Patent No.: US 8,461,457 B2
(45) Date of Patent: Jun. 11, 2013

(54) GROMMET

(75) Inventors: Kouji Miyakoshi, Susono (JP); Akimizu Kamishima, Susono (JP); Hidetoshi Sato, Sisono (JP); Yutaka Ishida, Utsunomiya (JP)

(73) Assignee: Yazaki Corporation, Tokyo (JP)

( * ) Notice: Subject to any disclaimer, the term of this patent is extended or adjusted under 35 U.S.C. 154(b) by 173 days.

(21) Appl. No.: 13/029,640

(22) Filed: Feb. 17, 2011

(65) Prior Publication Data

US 2011/0203833 A1 Aug. 25, 2011

(30) Foreign Application Priority Data

Feb. 19, 2010 (JP) .............................. P.2010-034319

(51) Int. Cl.
*H02G 3/22* (2006.01)
(52) U.S. Cl.
USPC ....................... 174/153 G; 174/152 G; 16/2.2
(58) Field of Classification Search
USPC .. 174/152 G, 153 G, 152 R; 439/604; 16/2.1, 16/2.2; 248/56; 277/606
See application file for complete search history.

(56) References Cited

U.S. PATENT DOCUMENTS 7,481,436 B2 * 1/2009 May et al. ..................... 277/606
7,915,535 B2 * 3/2011 Carter ....................... 174/152 G

FOREIGN PATENT DOCUMENTS

JP 11-336953 12/1999

* cited by examiner

*Primary Examiner* — Dhirubhai R Patel
(74) *Attorney, Agent, or Firm* — Finnegan, Henderson, Farabow, Garrett & Dunner, LLP

(57) ABSTRACT

A grommet includes an outer body and an inner body. The outer body, is formed with a wire insertion hole through which a wire is inserted, and has a panel fitting portion at a circumferential portion thereof. The panel fitting portion fits in a first panel hole having a first diameter. The inner body, is attached to the outer body, and has a locking fitting portion at a circumferential portion thereof. The locking fitting portion fits in a second panel hole having a second diameter smaller than the first diameter and locks an inner edge portion of the second panel hole.

7 Claims, 15 Drawing Sheets

GROMMET

BACKGROUND

The present invention relates to a grommet used for laying down a wire such as a wiring harness in a vehicle.

In a vehicle, when a wire such as a wiring harness is laid into an interior of a passenger compartment from an engine compartment, the wire needs to pass through a dash panel. In addition, when the wire is laid into the vehicle, the wire needs to pass through a floor panel. A grommet is used not only to hold the wire at such a location where the wire passes through the dash panel or the floor panel but also to secure waterproofing and soundproofing properties thereat.

FIG. 17 shows a conventional grommet 100 described in Patent Document 1. The grommet 100 has a body 120 through which an wire insertion hole 110 passes in an axial direction, and an wire 200 is inserted through the wire insertion hole 110. The body 120 is formed of a rubber in whole and has a thick panel fitting portion 130 and thin wire insertion ports 140, 150 which are formed at axial end portions of the panel fitting portion 130 and into which the wire 200 is inserted.

A first engagement groove 160 and a second engagement groove 170 are formed on an outer face of the panel fitting portion 130 at a substantially central portion in the axial direction. The two engagement grooves 160, 170 are formed as an annular depression which extends along the full circumference of the outer face of the panel fitting portion 130. These engagement grooves 160, 170 correspond to two types of panel holes having different diameters which are formed in a panel 250, and by the engagement grooves 160, 170 being fitted in the panel, the grommet 100 is fixed in the panel.

The first engagement groove 160 is formed in the panel fitting portion 130 in a position where a distance of the first engagement groove 160 from an axis of the wire insertion hole 110 is longer than that of the second engagement groove 170. The first engagement groove 160 corresponds to a panel hole having a larger hole diameter. The second engagement groove 170 is formed in a position where a distance of the second engagement groove 170 from an axis of the wire insertion hole 110 is shorter than that of the first engagement groove 160 and hence corresponds to a panel hole having a smaller panel hole diameter. The two engagement grooves 160, 170 have different fitting directions in which they are fitted in the panel 250. The first engagement groove 160 is fitted in the panel hole in the panel 250 from a direction indicated by an arrow M, while the second engagement groove 170 is fitted in the panel hole in the panel 250 from a direction indicated by an arrow N which is an opposite direction to the direction M.

In the construction described above, the grommet 100 which holds the wire 200 inserted therethrough is inserted into the panel hole in the panel 250 from the direction M or the direction N to match the hole diameter of the panel hole, whereby the grommet 100 can be fixed in the panel 250. Namely, in the construction shown in FIG. 17, by forming the two engagement grooves 160, 170 which are situated at the different heights and are fitted from the different directions on the panel fitting portion 130, the single grommet 100 is allowed to deal with the plurality of panel holes having the different hole diameters.

[Patent Document] Japanese Patent Publication Number 11-336953

SUMMARY

In the grommet 100 having the conventional construction, since the panel fitting portion 130 having the first engagement groove 160 and the second engagement groove 170 is formed of the thick rubber, a large force is necessary to insert the grommet 100 into the panel hole, leading to a problem that the mounting workability in fixing the grommet 100 in the panel becomes bad. On the other hand, since the panel fitting portion 130 is made of the rubber, the grommet 100 becomes easy to be disengaged from the panel hole with a small force, leading to a problem that the grommet 100 becomes easy to be disengaged from the panel 250.

In addition to this, there has been proposed a grommet having a two-component construction in which an inner body made of a rubber is incorporated in an interior of an outer body made of a thick rubber. In the grommet of this construction, two panel fitting portions having engagement grooves of different diameters are provided on the outer body, whereby the grommet is allowed to deal with two types of panel holes. However, since the two panel fitting portions are provided on the outer body, this grommet also cannot solve the above problems that the workability in mounting the grommet in the panel is bad and that the grommet is easy to be disengaged from the panel.

It is therefore one advantageous aspect of the present invention to provide a grommet which has a good mounting workability in mounting in a panel and which is difficult to be disengaged from the panel.

According to one aspect of the invention, there is provided a grommet comprising:

an outer body, formed with a wire insertion hole through which a wire is inserted, and having a panel fitting portion at a circumferential portion thereof, the panel fitting portion configured to fit in a first panel hole having a first diameter; and an inner body, attached to the outer body, and having a locking fitting portion at a circumferential portion thereof, the locking fitting portion configured to fit in a second panel hole having a second diameter smaller than the first diameter and to lock an inner edge portion of the second panel hole.

The outer body may include a panel abutment portion configured to be brought into abutment with the inner edge portion of the second panel hole in a state where the locking fitting portion fits in the second panel hole.

The grommet may be configured such that: the locking fitting portion includes a lock arm having: an arm part having flexibility and projected from the circumferential portion of the inner body; and a locking stepped part provided at a distal end of the arm part and configured to be engaged with the inner edge portion of the second panel hole, and the lock arm is provided on the circumferential portion of the inner body so as to extend along the full circumference thereof.

The grommet may be configured such that: the inner body includes: a cylindrical portion communicating with the wire insertion hole and through which the wire is inserted; and a connecting flange portion provided at one side of the cylindrical portion and engaged with the outer body to connect the inner body with the outer body, and the lock arm is provided on an outer circumference of the cylindrical portion.

The outer body and the inner body may be formed of a rubber.

The outer body may have a cylindrical holding portion formed with the wire insertion hole. A thickness of the cylindrical holding portion may be gradually reduced towards one end of the wire insertion hole. A plurality of ring portions may be formed on an inner face of the cylindrical holding portion to diminish a diameter of the wire insertion hole.

DETAILED DESCRIPTION OF EXEMPLIFIED EMBODIMENTS

Figure 1:
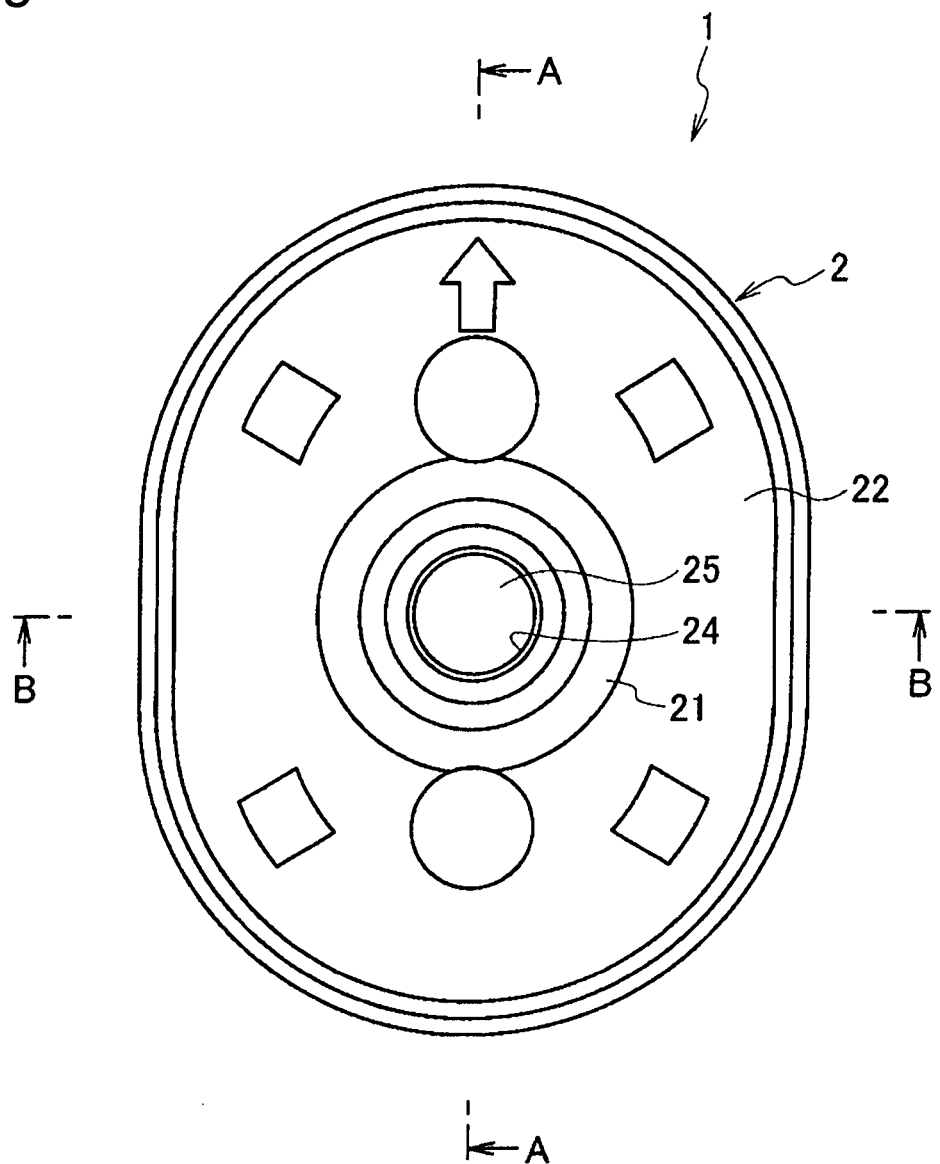
FIG. 1 is a front view of a grommet of an embodiment of the invention.

Hereinafter, the invention will be described specifically by an illustrated embodiment. FIG. 1 is a front view of a grommet 1 of an embodiment of the invention, FIG. 2 is a sectional view taken along the line A-A in FIG. 1, FIG. 3 is a sectional view taken along the line B-B in FIG. 1, FIG. 4 is an enlarge sectional view of a portion C in FIG. 3, FIGS. 5 to 9 are drawings depicting the fixation of the grommet 1 in a first panel 6 having a first panel hole 7, and FIGS. 10 to 14 are drawings depicting the fixation of grommet 1 to a second panel 8 having a second panel hole 9.

Figure 2:
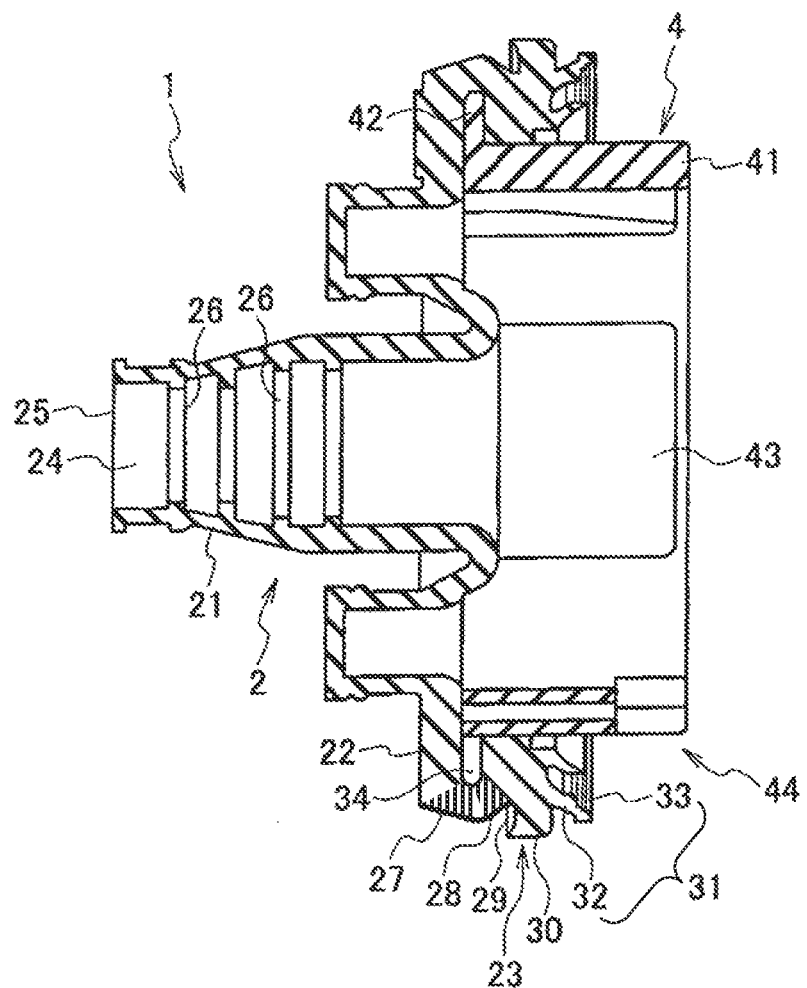
FIG. 2 is a sectional view taken along the line A-A in FIG. 1.
Figure 3:
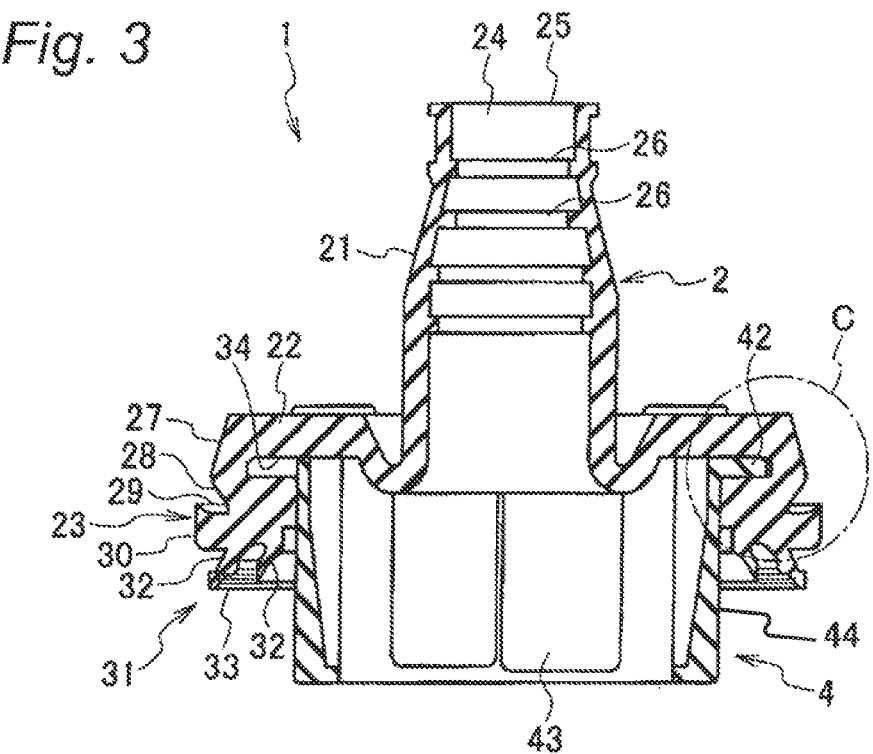
FIG. 3 is a sectional view taken along the line B-B in FIG. 1.
Figure 4:
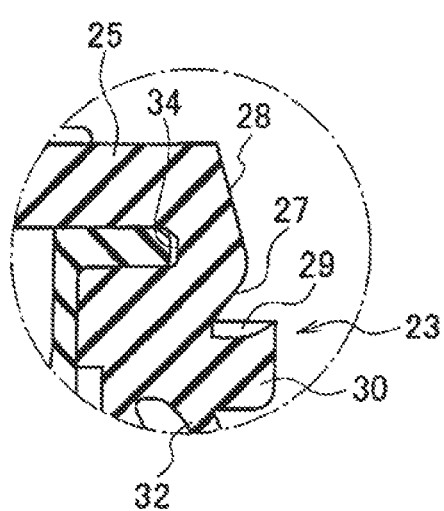
FIG. 4 is an enlarged sectional view of a portion C in FIG. 3.

As is shown in FIGS. 1 to 3, the grommet 1 is formed by assembling an outer body 2 and an inner body together. The outer body 2 is formed of a rubber such as a soft elastomer in whole, and the inner body 4 is also formed of a similar rubber to that of the outer body 2 in whole.

The outer body 2 is formed by a cylindrical holding portion 21 having a cylindrical shape which extends in an axial direction, a flange portion 22 which spreads radially from the cylindrical holding portion 21 and a panel fitting portion 23 formed on an outer circumference of the flange portion 22.

An interior portion of the cylindrical holding portion 21 which extends in the axial direction is configured as a wire insertion hole 24 through which an wire (not shown) is inserted, and one end of the wire insertion hole 24 constitutes an wire insertion port 25. The cylindrical holding portion 21 is formed thinner than the flange portion 22 in whole. In addition, in the thin cylindrical holding portion 21, the thickness is gradually reduced towards the wire insertion port 25. Because of this, the cylindrical holding portion 21 is light in weight and has a large flexibility, whereby the cylindrical holding portion 21 can follow the flexure, vibration and displacement of the wire while closely attached to the wire. This effects waterproofing and soundproofing actions in an ensured fashion.

A plurality of ring portions 26 are formed on an inner face of the cylindrical holding portion 21 to diminish the diameter of the wire insertion hole 24. The plurality of ring portions 26 have different inside diameters so as to match outside diameters of wires which are inserted through the wire insertion hole 24 so that the grommet 1 can be closely attached to outer faces of the wires.

The flange portion 22 spreads radially from an axial terminating end portion of the cylindrical holding portion 21 in such a state that the flange portion 22 is thicker than the cylindrical holding portion 21. By making the flange portion 22 thick, a predetermined strength is imparted to the flange portion 22.

As is shown in FIG. 1, an external shape of the flange portion 22 is formed so as to match a shape of a panel hole in which the grommet 1 is fixed. In this embodiment, since a first panel hole 7 shown in FIG. 5 has an oval shape, the flange portion 22 has an external shape which extends radially into an oval shape. When the panel hole is circular or quadrangular, the external shape of the flange portion 22 extends radially to match the circular of quadrangular shape of the panel hole. In any case, the flange portion 22 is set so as to have a larger external shape than the diameter of a corresponding panel hole, and when the grommet 1 is mounted in the panel hole, the flange portion 22 functions to cover the panel hole to close it.

Figure 5:
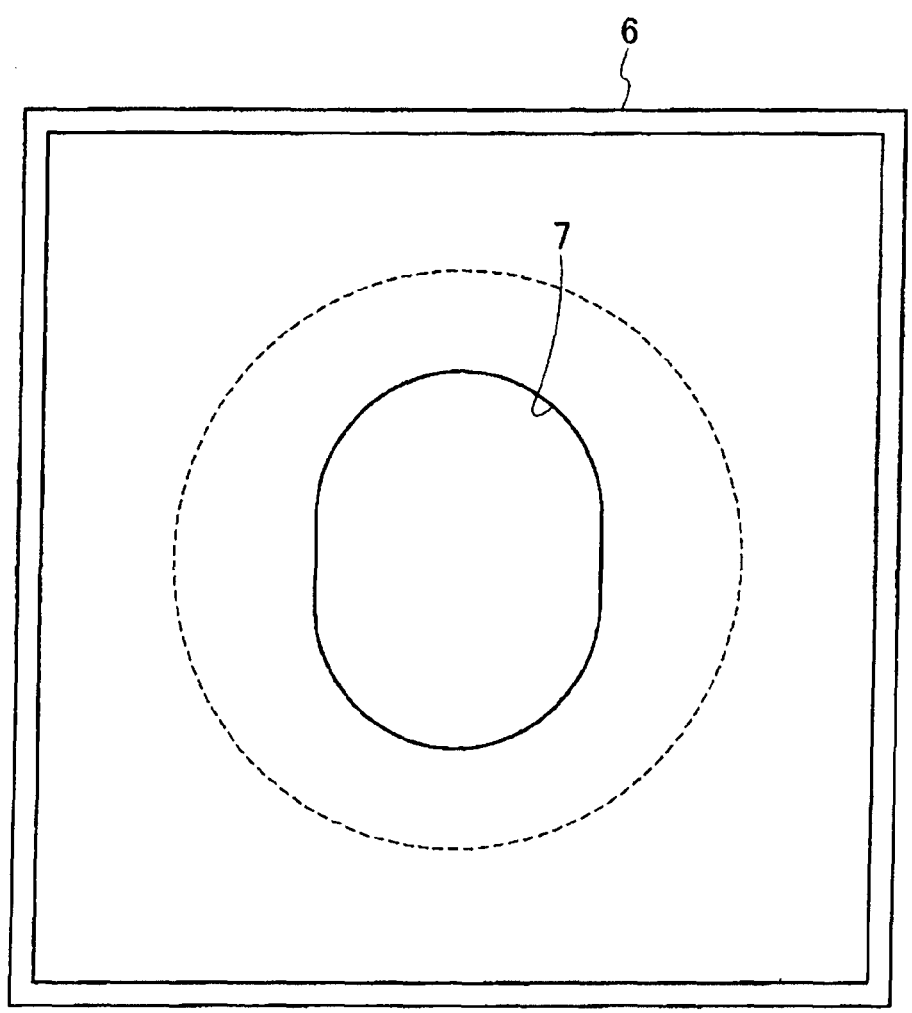
FIG. 5 is a front view of a first panel of the embodiment.

The panel fitting portion 23 is formed integrally with the flange portion 22 by bending an outer circumference of the flange portion in an axial direction. As is shown in FIGS. 2 to 4, the panel fitting portion 23 is connected to the flange portion 22 via a diametrically expanding portion 27 which slopes in a diametrically expanding direction while being connected to the flange portion 22 and a diametrically contracting portion 28 which slops in a diametrically contracting direction while being connected to the flange portion 22. The panel fitting portion 23 is such as to fit in the first panel hole 7 having a larger diameter which is shown in FIG. 5.

The diametrically expanding portion 27 functions as a guide on which an edge portion of an opening of the first panel hole 7 slides when the grommet 1 is fixed in a first panel 6 in which the first panel hole having the larger diameter is formed. The diametrically contracting portion 28 functions as a guide along which the edge portion of the opening of the first panel hole 7 drops in the panel fitting portion 23 after it has slid along the diametrically expanding portion 27. The diametrically expanding portion 27 and the diametrically contracting portion 28 are formed substantially as thick as the flange portion 22 so as to be deflected slightly but not to be deflected more than necessary when the opening portion of the first panel hole 7 slides therealong.

The panel fitting portion 23 has a groove portion 29 and a panel abutment collar portion 30. The groove portion 29 is formed by depressing a terminating end portion of the diametrically contracting portion 28. The panel abutment collar portion 30 extends in the diametrically expanding direction while rising from the grove portion 29 so as to be at right angles to the axial direction. The panel abutment collar portion 30 is as thick as the flange portion and can be brought into abutment with the first panel 6 with a predetermined strength.

In the panel fitting portion 23, the edge portion of the opening of the first panel hole 7 drops in the groove portion 29, and the panel abutment collar portion 30 is brought into abutment with a circumferential portion of the first panel hole 7 with the edge portion of the opening of the first panel hole 7 dropping in the groove portion 29, whereby the panel fitting portion 23 fits in the first panel hole 7, and the grommet 1 is fixed in the first panel 6 by the fitment of the panel fitting portion 23 in the first panel hole 7.

In addition to those constituent elements, a panel abutment portion 31 is formed on the panel fitting portion 23. The panel abutment portion 31 is provided at one axial end portion of the panel fitting portion 23 (a right-hand end portion in FIG. 2, a lower end portion in FIG. 3) and is formed by a plurality of elastic support portions 32 which extend in the axial direction from the panel abutment flange portion 30 and abutment walls 33 which are formed integrally at extending end portions of the elastic support portions 32. The elastic support portions 32 are thin, extend in the axial direction and are made easy to be deflected. The abutment walls 33 extend in a direction which is at right angles to the axial direction. As will be described later, in the panel abutment portion 31 configured in this way, when the elastic support portions 32 are deflected, the abutment walls 33 are brought into abutment with a inner edge of an opening of the a second panel hole 9. By this abutment, a second panel 8 having the second panel hole 9 is locked together with the inner body 4.

As is shown in FIGS. 2 to 4, a connecting groove portion 34 is formed in a back side of the flange portion 22. The connecting groove portion 34 is formed by a space portion which extends in a direction which is at right angles to the axial direction between an inward portion of the panel abutment collar portion 30 and the back side of the flange portion 22. The connecting groove portion 34 is a portion where the inner body 4 is connected integrally with the outer body 2.

As is shown in FIGS. 2 and 3, the inner body 4 has a cylindrical portion 41 and a connecting flange portion 42.

The cylindrical portion 41 is opened at axial end portions, and an interior portion thereof is made into an wire insertion part 43 which communicates with the wire insertion hole 24 in the outer body 2 so that the wire is inserted therethrough. A locking fitting portion 44 is provided on an outer circumference of the cylindrical portion 41.

The connecting flange portion 42 is formed at the end portion of the cylindrical portion 41 which faces the outer body 2 so as to extend in a direction which is at right angles to the axial direction. The connecting flange portion 42 is inserted in the connecting groove portion 34 formed in the outer body 2 to thereby be brought into engagement with the connecting groove portion 34. By this engagement, the inner body 4 is connected to the outer body 2 so as to be integral therewith.

Figure 14:
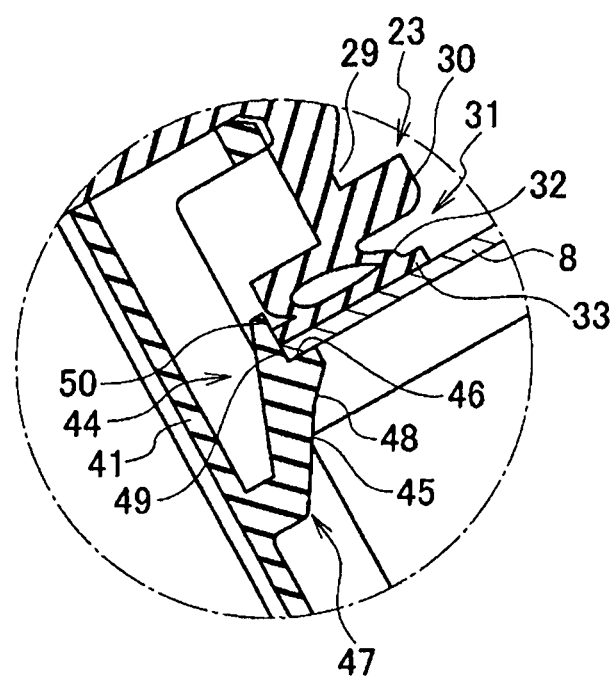
FIG. 14 is a sectional view taken along the line J-J in FIG. 11.

The locking fitting portion 44 is designed to fit in an edge portion of an opening of the second panel hole 9 (refer to FIG. 10) having an outside diameter which is smaller than that of the first panel hole 7 and is formed by a locking arm 47 provided on an outer circumference of the cylindrical portion 41 so as to extend along the full circumference thereof. As is shown in FIG. 14, the locking arm 47 has an arm part 45 which is formed on the outer circumference of the cylindrical portion 41 so as to extend along the full circumference thereof and a locking stepped part 46 which is formed at the arm part 45.

The arm part 45 projects from an outer face of the cylindrical portion 41 so as to rise in a sloping fashion towards the panel abutment portion 31 of the outer body 2 and has flexibility. A rising height of the arm part 45 is set in accordance with the hole diameter of the second panel hole 9. The arm part 45 gets thicker gradually from a proximal end portion towards a distal end portion thereof, whereby an outer face of the arm part 45 constitutes a sloping guide portion 48 which slopes upwards towards the panel abut portion 31. The sloping guide portion 48 functions as a guide when the edge portion of the opening of the second panel hole 9 slides on the arm part 45.

The locking stepped part 46 is formed by cutting part of a distal end portion of the arm part 45. The locking stepped part 46 is formed by cutting part of the distal end portion of the arm part 45 in a direction which is at right angles to the axial direction, whereby the locking stepped part 46 is brought into abutment with the edge portion of the opening of the second panel hole 9 and functions to lock the grommet 1 thereat. A further distal end portion of the locking stepped part 46 is made into a receiving face 50, and a groove portion 49 depressed along a circumferential direction is formed at a boundary portion between the receiving face 50 and the locking stepped part 46 so as to extend in the circumferential direction. An end face of the second panel hole 9 is brought into abutment with the receiving face 50 to thereby be supported thereon, and the end face of the second panel hole 9 drops in the groove portion 49 to thereby be supported therein.

Figure 6:
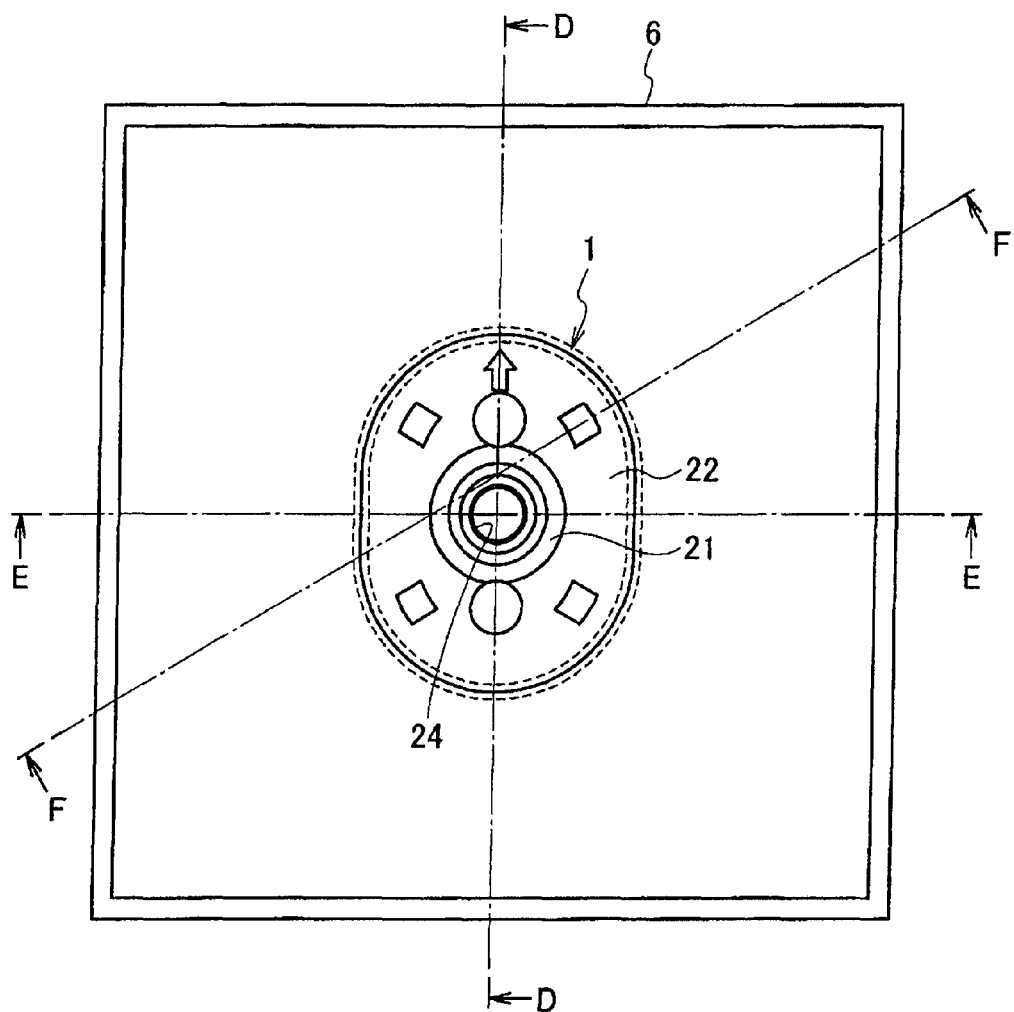
FIG. 6 is a front view showing a state in which the grommet is fixed in the first panel shown in FIG. 5.
Figure 7:
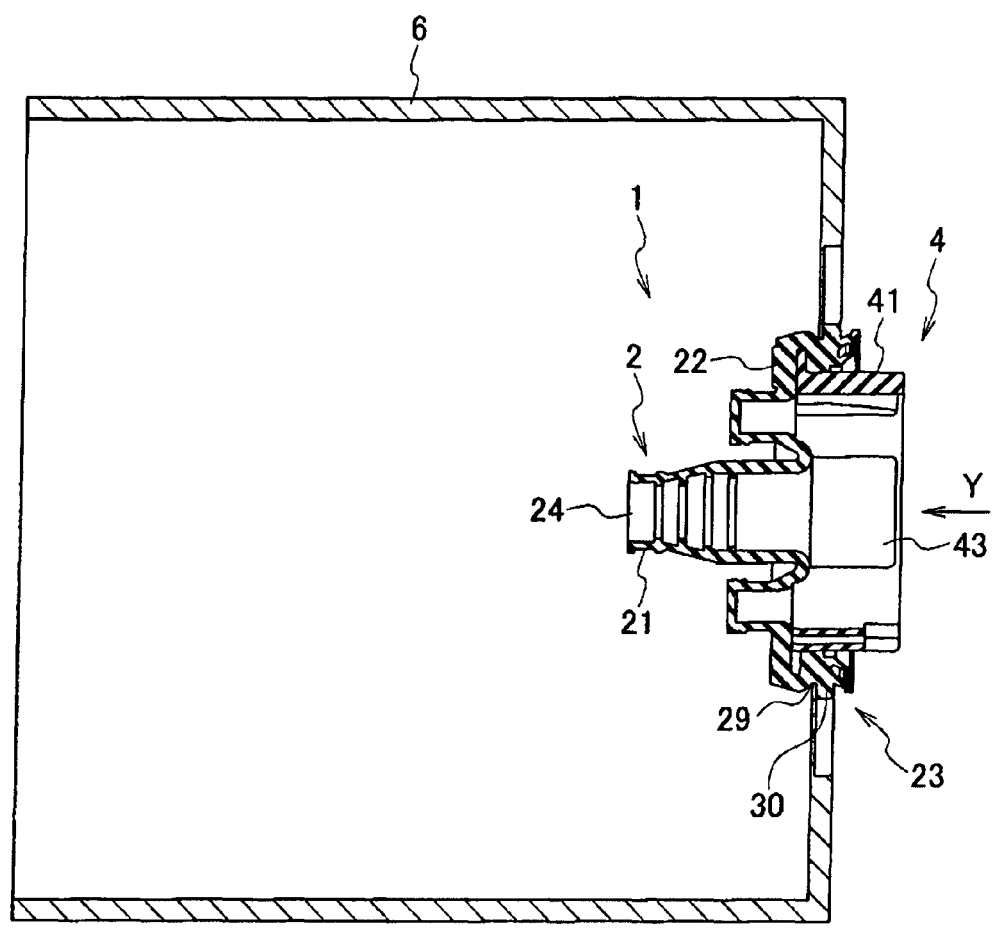
FIG. 7 is a sectional view taken along the line D-D in FIG. 6.
Figure 8:
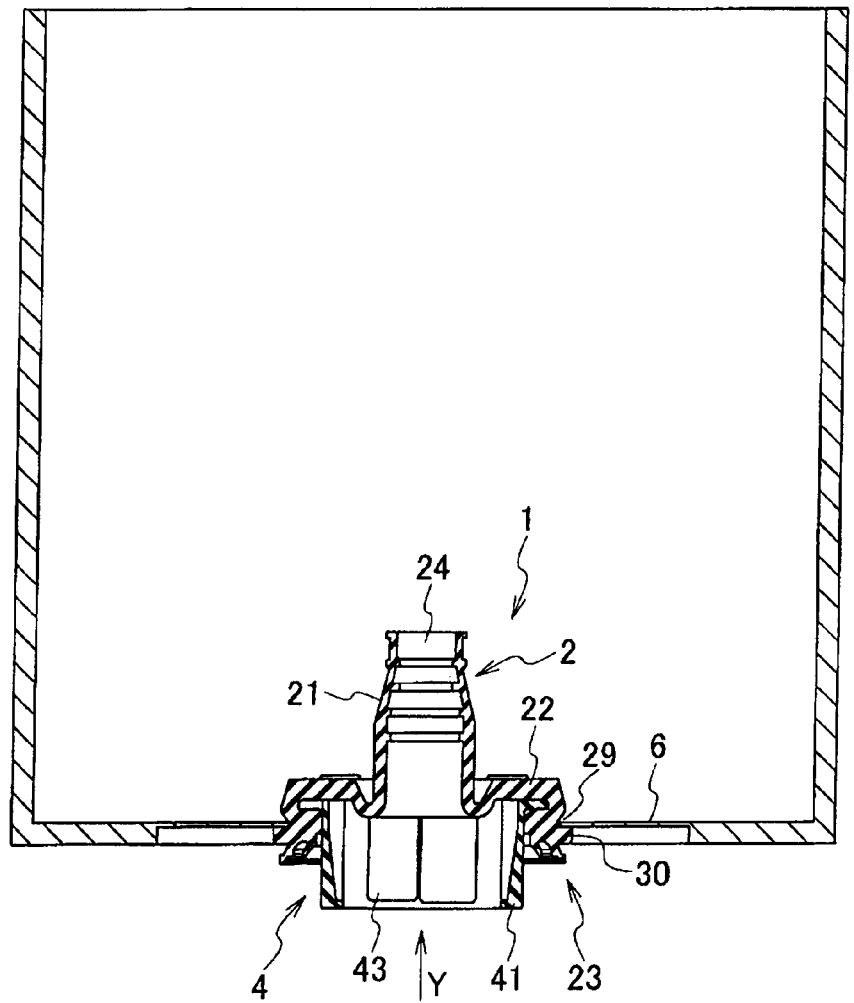
FIG. 8 is a sectional view taken along the line E-E in FIG. 6.
Figure 9:
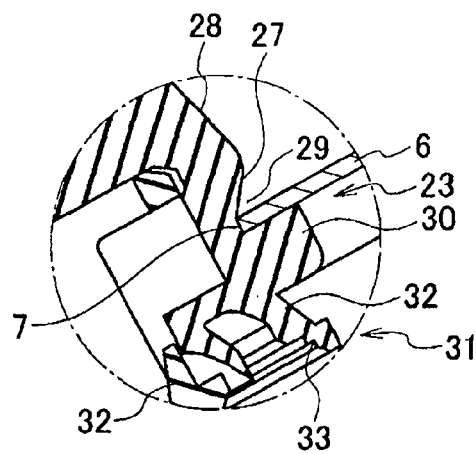
FIG. 9 is a sectional view taken along the line F-F in FIG. 6.

Next, a using method of the grommet 1 of the embodiment will be described by reference to FIGS. 5 to 14. FIGS. 5 to 9 show the fixation of the grommet 1 in the first panel 6 having the first panel hole 7. FIG. 5 is a front view of the first panel 6, FIG. 6 is a front view showing a state in which the grommet 1 is fixed in the first panel 6, FIG. 7 is a sectional view taken along the line D-D in FIG. 6, FIG. 8 is a sectional view taken along the line E-E in FIG. 6, and FIG. 9 is a partially enlarged sectional view taken along the line F-F in FIG. 6.

The grommet 1 is inserted in the first panel 6 having the first panel hole 7. Specifically, the grommet 1 is inserted in the first panel hole 7 along a direction Y shown in FIGS. 7 and 8 with the panel fitting portion 23 oriented towards the first panel hole 7. Prior to this insertion, in the grommet 1, the wire, whose illustration is omitted, is inserted through the wire insertion hole 24 and the wire insertion part 43 so as to be held in the cylindrical holding portion 21.

By the insertion of the grommet 1 along the direction Y in the first panel hole 7, the edge portion of the opening of the first panel hole 7 slides on the diametrically expanding portion 27 of the flange portion 22, thereafter, reaches the diametrically contracting portion 28 and drops in the groove portion 29 in the panel fitting portion 23 which is formed at the terminating end portion of the diametrically contracting portion 28. At the same time as this occurs, the panel abutment collar portion 30 of the panel fitting portion 23 is brought into abutment with the inner edge portion of the opening of the first panel hole 7 and is then brought into abutment with the first panel 6. By this abutment, the panel fitting portion 23 fits in the first panel hole 7, and the grommet 1 is fixed in the first panel 6 with the first panel hole 7 sealed with the flange portion 22.

Figure 10:
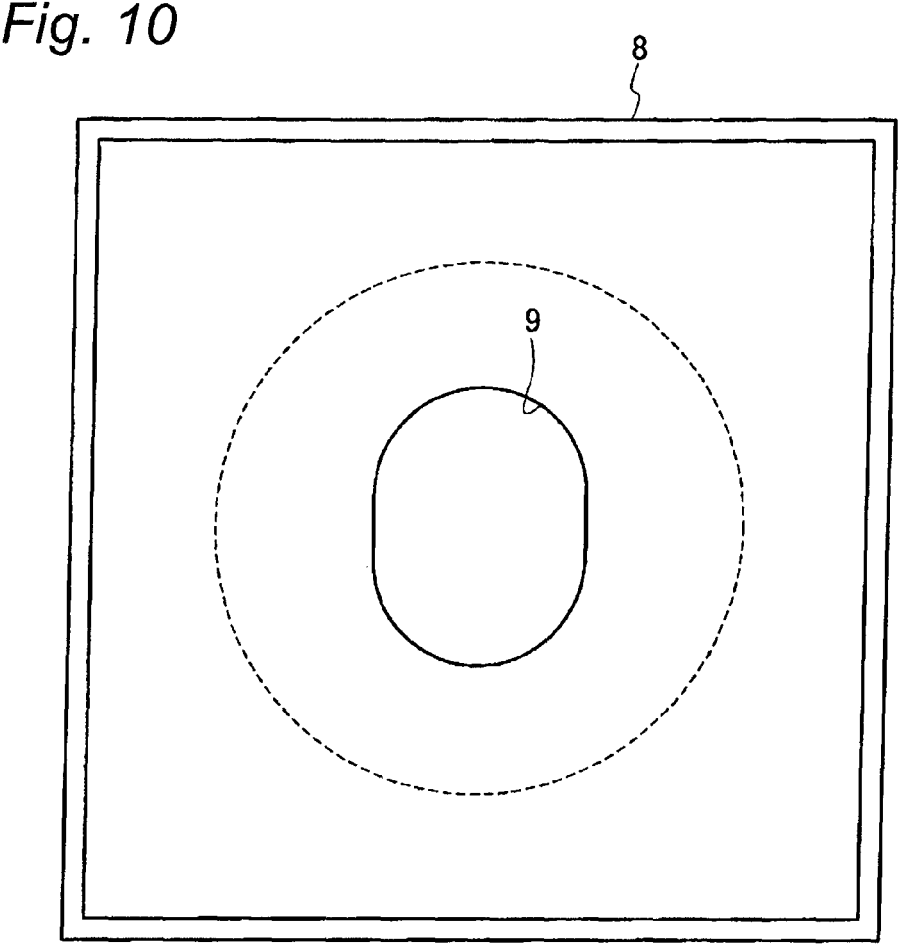
FIG. 10 is a front view of a second panel of the embodiment.
Figure 11:
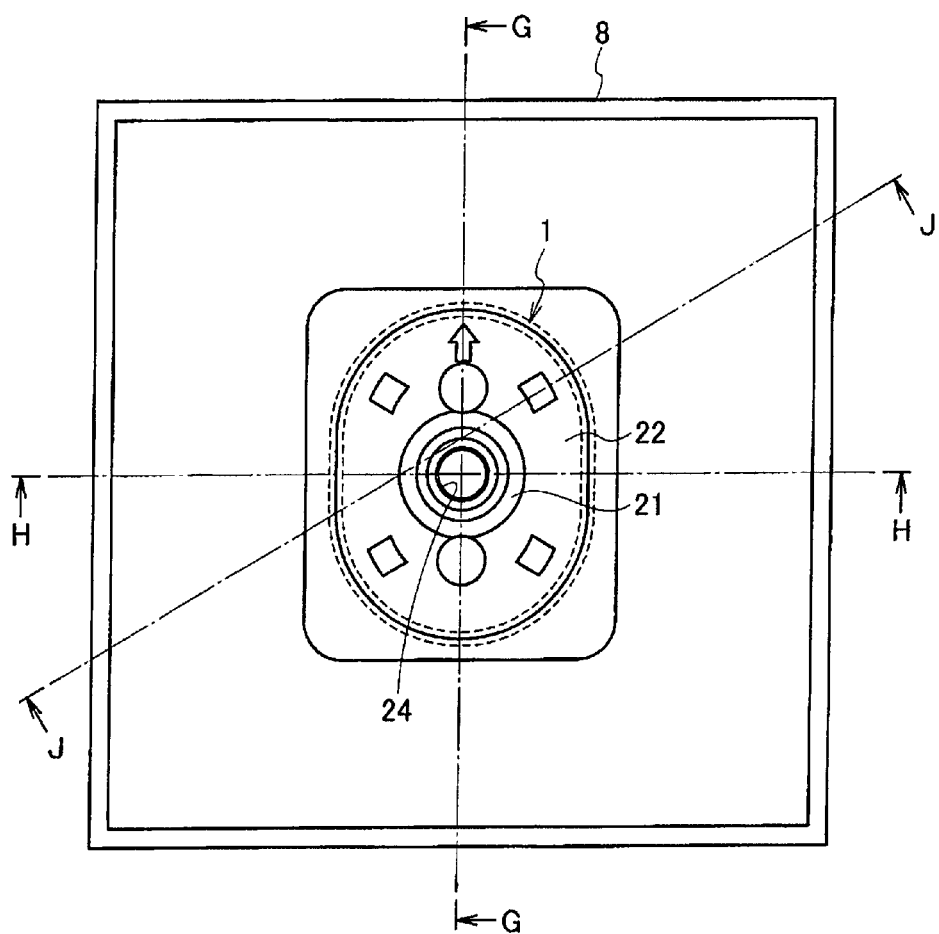
FIG. 11 is a front view showing a state in which the grommet is fixed in the second panel shown in FIG. 10.
Figure 12:
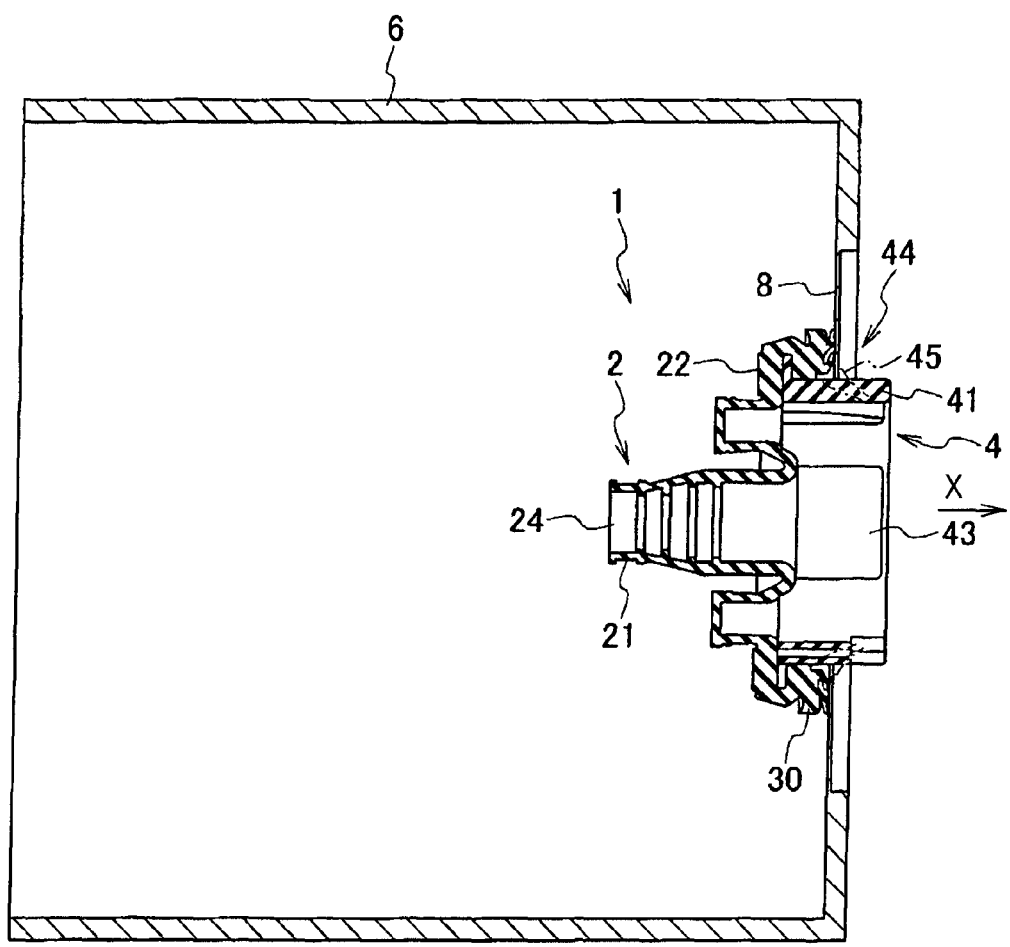
FIG. 12 is a sectional view taken along the line G-G in FIG. 11.
Figure 13:
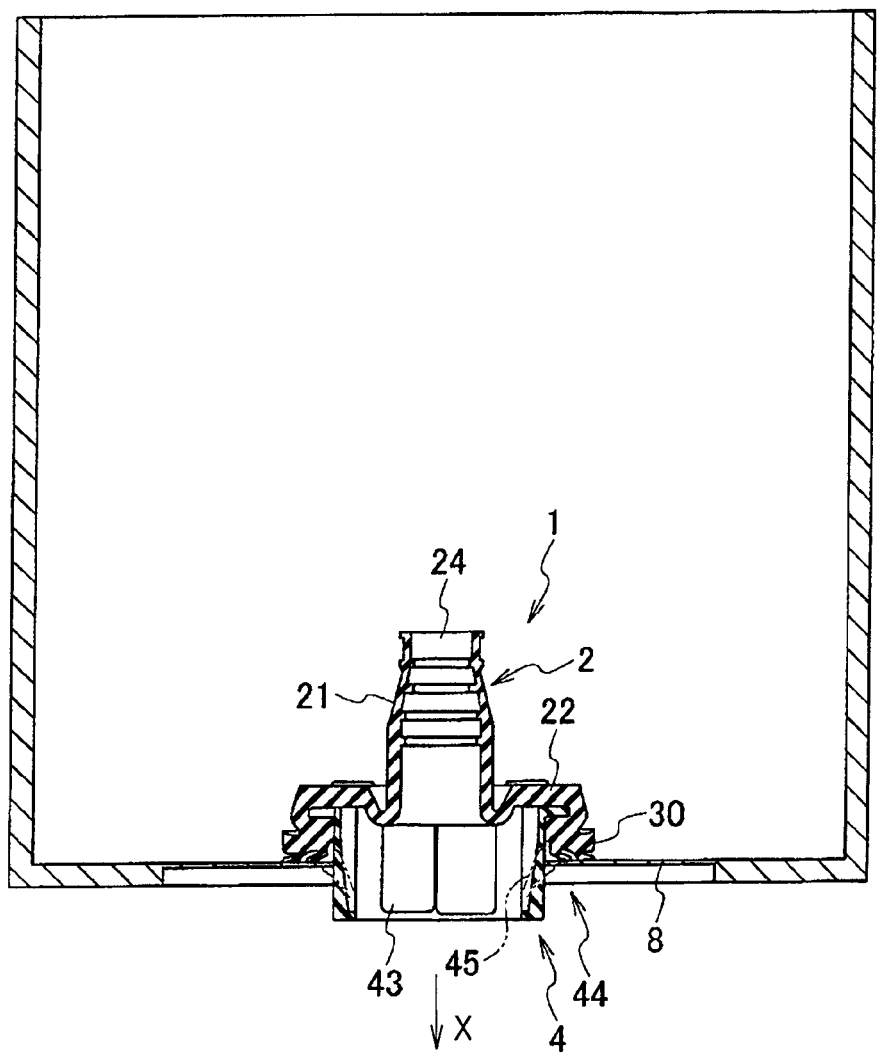
FIG. 13 is a sectional view taken along the line H-H in FIG. 11.

FIG. 10 is a front view of the second panel 8, FIG. 11 is a front view showing a state in which the grommet 1 is fixed in the second panel 8, FIG. 12 is a sectional view taken along the line G-G in FIG. 11, FIG. 13 is a sectional view taken along the line H-H in FIG. 1, and FIG. 14 is a partially enlarged sectional view taken along the line J-J in FIG. 11.

The second panel hole 9, which is smaller in diameter than the first panel hole 7, is formed in the second panel 8, and the grommet 1 is inserted in the second panel 8. Specifically, the grommet 1 is inserted in the second panel hole 9 along the direction X shown in FIGS. 12 and 13 with the locking fitting portion 44 oriented towards the second panel hole 9. The direction X is an opposite direction to the direction Y described above. Prior to the insertion of the grommet 1 in the second panel hole 9, in the grommet 1, the wire, whose illustration is omitted, is inserted through the wire insertion hole 24 and the wire inserting portion 43 so as to be held in the cylindrical holding portion 21.

By the insertion of the grommet 1 in the second panel hole 9 along the direction X, the edge portion of the opening of the second panel hole 9 slides along the sloping guide portion 48 while deflecting the arm part 45 and thereafter drops in the groove portion 49 at the terminating end portion of the arm part 45, whereby the locking stepped part 46 is brought into abutment with the inner edge portion of the opening of the second panel hole 9. In addition, the second panel 8 presses against the panel abutment portion 31 on the outer body 2 by the sliding of the second panel hole 9. By the panel abutment portion 31 being so pressed against, the elastic support portions 32 of the panel abutment portion 31 are deflected in the direction in which the panel abutment portion 31 is pressed against, and thereafter, the abutment walls 33 are brought into abutment with a peripheral portion of the second panel hole 9 along an opposite direction to the direction in which the panel abutment portion 31 is pressed against. By this abutment, since the inner edge portion of the opening of the second panel hole 9 is held by the locking stepped part 46 of the locking fitting portion 44 and the abutment walls 33 of the panel abutment portion 31 in the second panel 8, the inner edge portion of the opening of the second panel hole 9 fits on the inner body 4 in a locked state. By this fitment, the grommet 1 is fixed in the second panel 8 strongly and rigidly with the second panel hole 9 sealed by the flange portion 22.

In fixing the grommet 1 in the panels 6, 7, in the event that the grommet 1 is reversed, the grommet can be moved along the direction X when fitted in the first panel hole 7 and can be moved along the direction Y when fitted in the second panel hole 9.

According to the grommet 1 of the embodiment that is configured in the way described above, the panel fitting portion 23 which can fit in the first panel hole 7 is formed on the outer body 2, and the locking fitting portion 44 which fits in the edge portion of the opening of the second panel hole 9 which is smaller in diameter than the first panel hole 7 is provided on the inner body 4. Therefore, the panel holes 7, 9 having the different hole diameters can be dealt with by the same grommet, and the single grommet 1 can deal with a panel holes having a plurality of hole diameters.

In addition, since the panel fitting portion is provided on the outer body 2 and the locking fitting portion 44 is provided on the inner body 4, the grommet 1 can be inserted in the panel holes 7, 9 with independent forces. Because of this, a large force is not necessary in inserting the grommet 1 individually in the panel holes 7, 9, the mounting workability of the grommet 1 in the panels 6, 8 being thereby improved. Further, since the panel fitting portion 23 and the locking fitting portion 44 are made difficult to be disengaged from the panel holes 7, 9, the grommet 1 is also made difficult to be disengaged from the panel 6, 8.

In inserting the inner body 4 in the second panel hole 9, since the second panel hole 9 is held by the locking fitting portion 44 and the panel abutment portion 31 of the outer body 2 to thereby be locked, the grommet 1 can be fixed in the second panel 8 strongly and rigidly.

Since the locking fitting portion 44 (the locking arm 47) of the inner body 44 includes the flexible arm part 45 and this arm part 45 is deflected when fitting in the second panel hole 9, the fitting of the second panel 9 on the locking fitting portion 44 can be effected with a small force.

Since the connecting flange portion 42 is provided on the inner body 4 and this connecting flange portion 42 is brought into engagement with the outer body 2 so that the inner body 4 and the inner body 2 become integral with each other, not only is the connection of the inner body 4 with the outer body 2 facilitated but also the separation of the former from the latter is facilitated.

Figure 15:
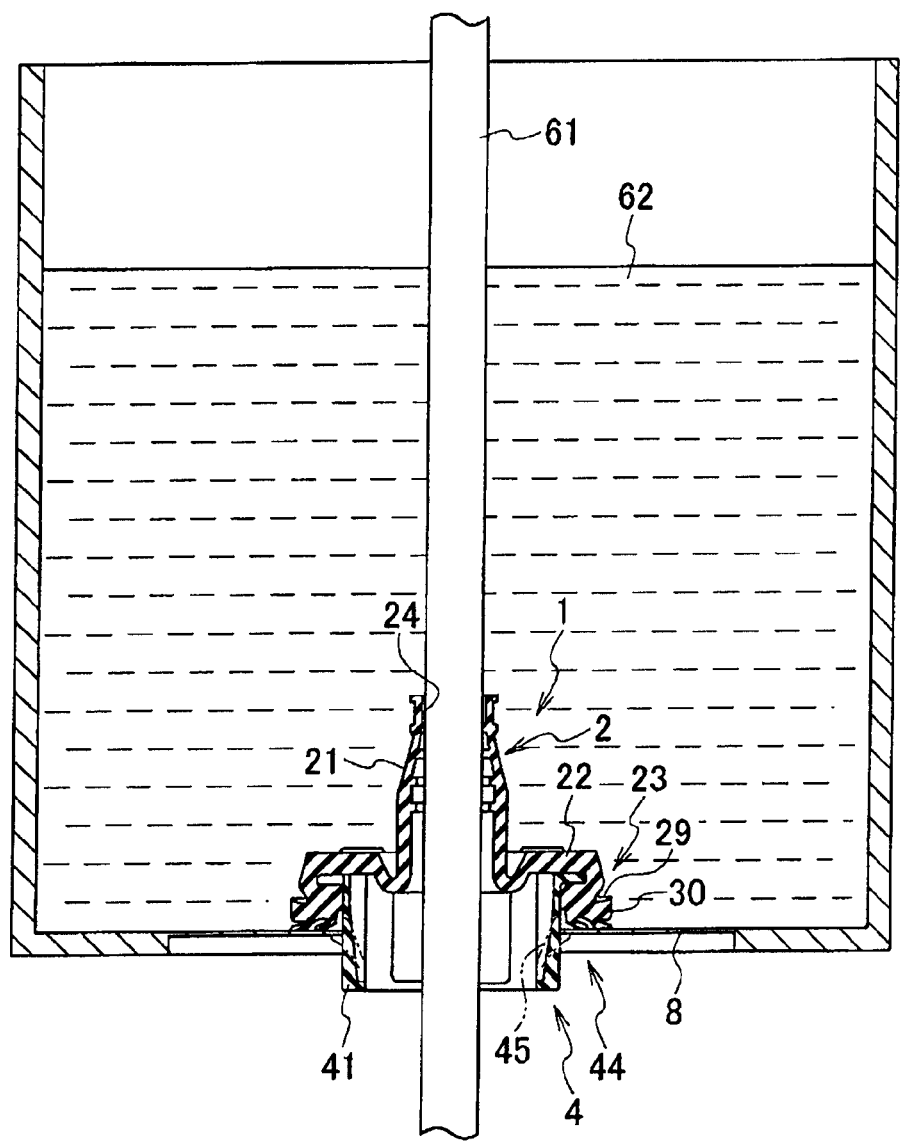
FIG. 15 is a sectional view showing an inter-wire water stop test of a wiring harness by use of an inner body of the grommet.
Figure 16:
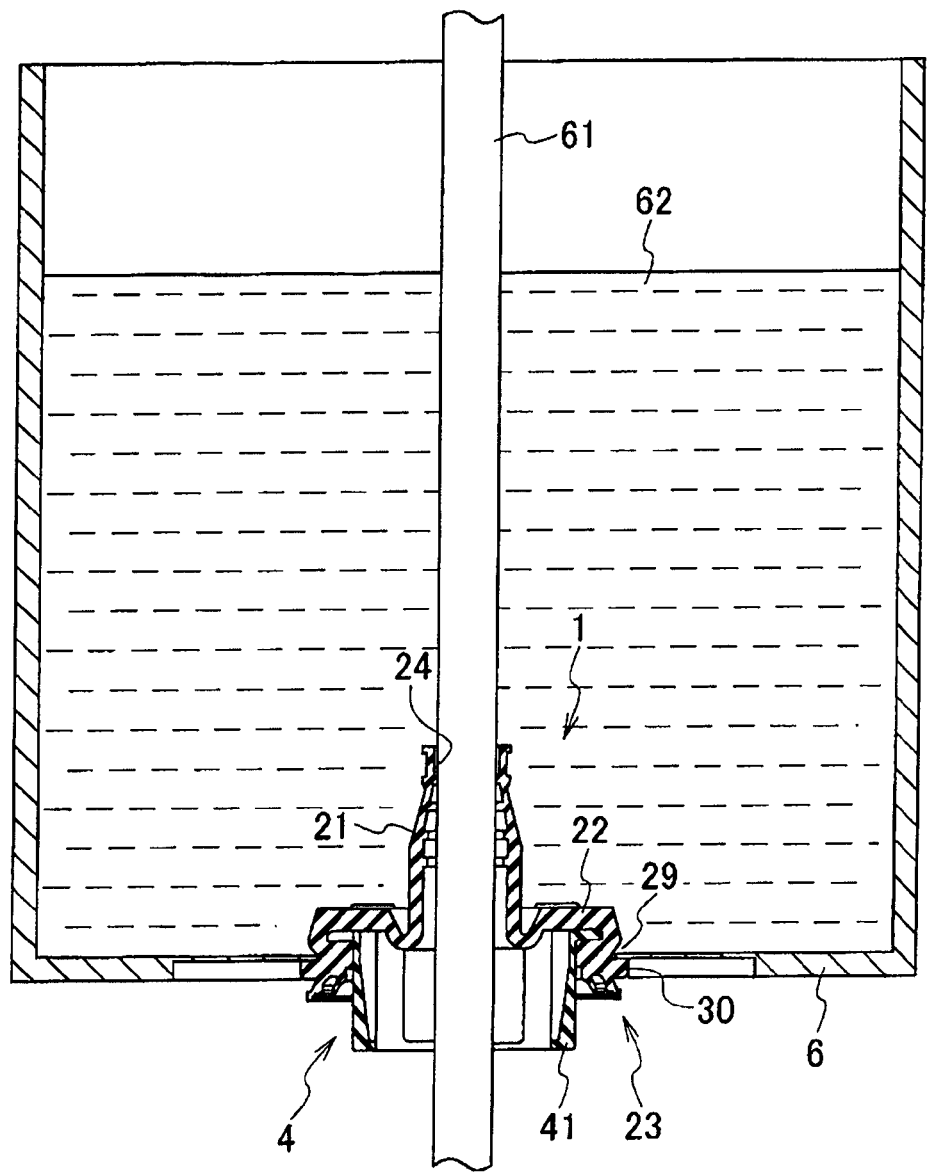
FIG. 16 is a sectional view showing an inter-wire water stop test of a wiring harness by use of an outer body of the grommet.
Figure 17:
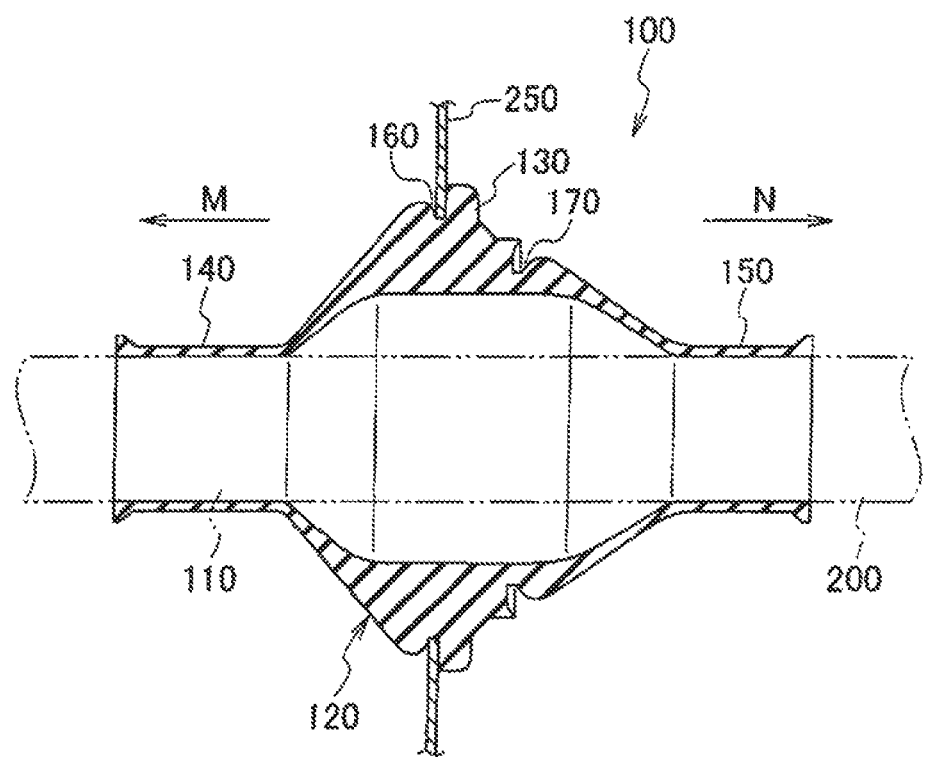
FIG. 17 is a sectional view showing a conventional grommet.

FIGS. 15 and 16 are sectional views showing a state in which a wiring harness 61 as the wire is passed through the grommet 1 of the embodiment to carry out an inter-wire water stop test on the wiring harness 61. Panels 6, 8 have a box-like configuration. In carrying out tests, the grommet 1 through which the wiring harness 61 is inserted following the procedure described above is fitted in each of the panels 6, 8, and thereafter water 62 is filled in the panels 6, 8.

FIG. 15 shows a state in which the locking fitting portion 44 on the inner body is fitted in a second panel hole 9 in the second panel 8, and FIG. 16 shows a state in which the panel fitting portion 23 on the outer body 2 is fitted in a first panel hole 7 in the first panel 6.

In disengaging the grommet 1 from the panels 6, 8 after the tests, since the locking fitting portion 44 on the inner body 4 holds the second panel hole 9 together with the panel abutment portion 31 on the outer body 2, the locking effected is difficult to be released, and there is caused a fear that whitening and damage are produced in the locking fitting portion 44 and the panel abutment portion 31. In contrast to this, since the panel fitting portion 23 on the outer body 2 fit in the inner edge portion of the opening of the first panel hole 7, the panel fitting portion 23 is easy to be disengaged from the first panel 6, and the workability is improved. Consequently, in the inter-wire water stop tests of the wiring harness 61, the tests can easily be carried out by use of the panel fitting portion 23 on the outer body 2.

Thus, the attachment of the grommet 1 in the panels 6, 8 can be effected by selecting the panel fitting portion 23 on the outer body 2 and the locking fitting portion 44 on the inner body 4 in consideration of workability and applications.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention.

What is claimed is:

1. A grommet comprising:
   an outer body, formed with a holding portion having a wire insertion hole through which a wire is inserted, and having a panel fitting portion at a circumferential portion of the holding portion, the panel fitting portion configured to fit in a first panel having a first hole with a first diameter to which the grommet is mounted; and
   an inner body, attached to a back end of the holding portion of the outer body, and having a wire insertion part aligned with the wire insertion hole of the outer body along an axis of the wire insertion hole, and having a locking fitting portion at a circumferential portion of the inner body, the locking fitting portion configured to fit in a second panel having a second hole with a second diameter smaller than the first diameter and to lock an inner edge portion of the second hole.

2. The grommet as set forth in claim 1, wherein
   the outer body includes a panel abutment portion configured to be brought into abutment with the inner edge portion of the second hole in a state where the locking fitting portion fits in the second hole.

3. The grommet as set forth in claim 1, wherein
   the locking fitting portion includes a lock arm having:

an arm part having flexibility and projected from the circumferential portion of the inner body; and a locking stepped part provided at a distal end of the arm part and configured to be engaged with the inner edge portion of the second hole, and wherein the lock arm is provided on the circumferential portion of the inner body so as to extend along the full circumference thereof.

4. The grommet as set forth in claim 3, wherein the inner body includes:

a cylindrical portion communicating with the wire insertion hole and through which the wire is inserted; and a connecting flange portion provided at one side of the cylindrical portion and engaged with the outer body to connect the inner body with the outer body, and wherein the lock arm is provided on an outer circumference of the cylindrical portion.

5. The grommet as set forth in claim 1, wherein the outer body and the inner body are formed of a rubber.

6. The grommet as set forth in claim 1, wherein the holding portion is substantially cylindrical, and wherein a thickness of the cylindrical holding portion is gradually reduced towards one end of the wire insertion hole.

7. The grommet as set forth in claim 1, wherein the holding portion is substantially cylindrical, and wherein a plurality of ring portions are formed on an inner face of the cylindrical holding portion to diminish a diameter of the wire insertion hole.

\* \* \* \* \*